US008626365B2

United States Patent
Shimo et al.

(10) Patent No.: US 8,626,365 B2
(45) Date of Patent: Jan. 7, 2014

(54) AUTOMATIC STEERING CONTROL APPARATUS AND AUTOPILOT

(75) Inventors: Kazutoshi Shimo, Nishinomiya (JP); Hitoshi Maeno, Nishinomiya (JP); Tomoko Matsumoto, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 1374 days.

(21) Appl. No.: 10/582,970

(22) PCT Filed: Dec. 13, 2004

(86) PCT No.: PCT/JP2004/018966
§ 371 (c)(1),
(2), (4) Date: Jun. 15, 2006

(87) PCT Pub. No.: WO2005/058691
PCT Pub. Date: Jun. 30, 2005

(65) Prior Publication Data
US 2007/0162207 A1     Jul. 12, 2007

(30) Foreign Application Priority Data
Dec. 16, 2003  (JP) .................................. 2003-418313

(51) Int. Cl.
*G05D 1/00*   (2006.01)
*B63H 25/04*  (2006.01)
*B63H 25/06*  (2006.01)
*G01C 21/00*  (2006.01)

(52) U.S. Cl.
USPC ................. 701/21; 701/41; 701/42; 701/466; 114/162; 114/144 RE; 318/588

(58) Field of Classification Search
USPC ...... 701/21, 41, 42, 466; 114/144 RE, 144 R, 114/144 A, 144 E, 162; 318/588; 440/113, 440/84, 75, 53
See application file for complete search history.

(56) References Cited

U.S. PATENT DOCUMENTS

| | | | | |
|---|---|---|---|---|
| 3,715,571 A | * | 2/1973 | Braddon | 701/21 |
| 4,069,784 A | * | 1/1978 | Hedstrom et al. | 114/144 E |
| 4,817,000 A | * | 3/1989 | Eberhardt | 701/200 |
| 5,152,239 A | * | 10/1992 | Hossfield et al. | 114/144 E |
| 5,179,905 A | * | 1/1993 | Hossfield et al. | 114/144 E |
| 5,313,397 A | * | 5/1994 | Singh et al. | 701/21 |
| 5,331,558 A | * | 7/1994 | Hossfield et al. | 701/21 |
| 5,987,362 A | * | 11/1999 | Bessacini et al. | 701/1 |
| 6,611,737 B1 | * | 8/2003 | El-Tahan et al. | 701/21 |
| 2008/0027597 A1 | * | 1/2008 | Barrett et al. | 701/21 |

FOREIGN PATENT DOCUMENTS

| | | | |
|---|---|---|---|
| JP | 63-49599 A | 3/1988 | |
| JP | 08-119197 A | * 5/1996 | B63H 25/04 |
| JP | 8-119197 A | 5/1996 | |
| JP | 8-337197 A | 12/1996 | |

* cited by examiner

*Primary Examiner* — Christine Behncke

(57) ABSTRACT

An object of the present invention is to provide an automatic steering control apparatus, including an autopilot, which enables a ship to turn around a desired fixed point as a turning center with a desired turning radius without being affected by an extraneous factor, such as a tidal current or the like.
To achieve the object, a center position, a turning radius and a turning direction for turning are initially designated by the operator, a tangent to a turning circle at an intersection of a straight line from the turning center to a position of the ship and the turning circle, and a course of the ship is controlled to approach the tangent.

7 Claims, 10 Drawing Sheets

AUTOMATIC STEERING CONTROL
APPARATUS AND AUTOPILOT

CROSS REFERENCE OF RELATED
APPLICATION

Japanese Patent Application Tokugan No. 2003-418313 is hereby incorporated by reference.

TECHNICAL FIELD OF THE INVENTION

The present invention relates to an automatic steering control apparatus for ships which outputs a command rudder angle based on a deviation of a heading of the ship from a reference course, and more particularly, to an automatic steering control apparatus, including an autopilot, which enables a ship to turn around a desired turning center position with a desired turning radius.

BACKGROUND OF THE INVENTION

Conventional autopilots automatically steer a ship carrying the device in a manner which causes a bearing deviation of a current course of the ship from a target course, which is set manually, to be "0". In this case, when an initial bearing deviation is large, an order rudder angle having a large value is output. Therefore, a limiter is provided so that, when the value is larger than or equal to a predetermined value, a load larger than or equal to a predetermined value is prevented from being applied to actual steering of the ship.

An output of the limiter is transferred to an actuator, which in turn outputs a response rudder angle. After the response rudder angle is added with a disturbance factor, the result is transferred to a rudder of a ship body. A motion of a ship is measured as a bearing angle using a bearing sensor.

Conventional autopilots perform turning in accordance with a limit value of the limiter when a target course having a large bearing deviation is set. Therefore, after changing a course, stationary deviation and overshoot occur, so that smooth automatic course change cannot be achieved.

This causes a significant problem that, when there is a sea area which should be avoided, such as a floating obstruction or the like, a path different from an initially predicted turning path may be actually passed, so that safe course change cannot be achieved. Therefore, in such a sea area, course change needs to be performed by an effort made by a steersman, but not using an autopilot, resulting in an increase in load to the steersman.

A conventional autopilot which solves the problem will be described.

According to the conventional autopilot, a turning radius and a turning center as well as a target course are preset, as accumulated information, on plane coordinate axes. A rudder angle is adjusted so that the track of a ship carrying the device draws an arc having the turning radius with respect to the turning center.

Thereby, automatic course change can be smoothly and stably achieved, and a course after course change can be accurately predicted. In addition, a waste motion during automatic course change is reduced, thereby reducing fuel consumption (see Patent Document 1).

Patent Document 1: JP H08-119197A

However, since the conventional autopilot does not have means for finding a position of a ship carrying the device, the rudder angle is unavoidably set to be constant when a turning motion is performed. In the case of this method, the ship is drifted by an extraneous factor, such as tidal current, wind, or the like, in a direction of the extraneous factor, so that the turning center is also moved while the ship is turning (see FIG. 1). Therefore, although a turning operation is tried by the conventional autopilot, the ship only continues to turn in a constant direction, and cannot turn around a fixed point.

An object of the present invention is to provide an automatic steering control apparatus and an autopilot which have means for turning around a desired turning center position without being affected by extraneous factors, such as tidal current and the like.

SUMMARY OF THE INVENTION

The present invention provides an automatic steering control apparatus which is carried in a ship having a positioning device for measuring a position of the ship, and outputs a command rudder angle based on a deviation of a heading of the ship from a reference course, comprising an input device for inputting a desired turning center position, a memory for storing the turning center position input by the input device, and a rudder angle output device for outputting a command rudder angle so that a track of the ship draws an arc around a turning center stored in the memory with a turning radius, the turning radius being a distance from the position of the ship measured by the ship's positioning device to the turning center.

The present invention also provides an automatic steering control apparatus which is carried in a ship having a positioning device for measuring a position of the ship, and outputs a command rudder angle based on a deviation of a heading of the ship from a reference course, comprising an input device for inputting a desired turning radius and a desired turning center position, a memory for storing the turning radius and the turning center position input by the input device, and a rudder angle output device for outputting a command rudder angle so that a distance from the position of the ship measured by the ship's positioning device to a turning center stored in the memory, approaches the turning radius stored in the memory. The rudder angle output device outputs a command rudder angle so as to adjust a rudder angle so that a track of the ship draws an arc around the turning center with the turning radius from the time when the distance from the position of the ship to the turning center becomes substantially equal to the turning radius.

The present invention also provides an autopilot which is carried in a ship having a positioning device for measuring a position of the ship, and outputs a command rudder angle based on a deviation of a heading of the ship from a reference course, comprising an input device for inputting a desired turning center position, a memory for storing the turning center position input by the input device, and a rudder angle adjuster for adjusting a rudder angle so that a track of the ship draws an arc around a turning center stored in the memory with a turning radius, the turning radius being a distance from the position of the ship measured by the ship's positioning device to the turning center.

The present invention also provides an autopilot which is carried in a ship having a positioning device for measuring a position of the ship, and outputs a command rudder angle based on a deviation of a heading of the ship from a reference course, comprising an input device for inputting a desired turning radius and a desired turning center position, a memory for storing the turning radius and the turning center position input by the input device, and a rudder angle adjuster for adjusting a rudder angle so that a distance from the position of the ship measured by the ship's positioning device to a turning center stored in the memory, approaches the turning radius stored in the memory. The rudder angle adjuster adjusts a rudder angle so that a track of the ship draws an arc around the turning center with the turning radius from the time when the distance from the position of the ship to the turning center becomes substantially equal to the turning radius.

In the autopilot of the present invention, the input device can input a desired turning direction, the memory stores the turning direction input by the input device, and the rudder angle adjuster adjust a rudder angle so that the ship turns in the turning direction stored in the memory.

The autopilot of the present invention also has an interrupt controller for independently changing the turning direction, the turning radius and the turning center position, all of which are stored in the memory.

The present invention also provides an autopilot which is carried in a ship having a positioning device for measuring a position of the ship, and outputs a command rudder angle based on a deviation of a heading of the ship from a reference course, comprising an input device for inputting a desired turning direction, a desired turning radius, and a desired turning center position, a memory for storing the turning direction, the turning radius and the turning center position input by the input device, and a rudder angle adjuster for obtaining a straight line connecting the position of the ship measured by the ship's positioning device and a turning center stored in the memory for storing the turning center position, obtaining an intersection of the straight line and a turning circle drawn around the turning center stored in the memory with the turning radius stored in the memory, obtaining a tangent to the turning circle at the intersection, calculating a distance difference between the position of the ship and the intersection, and adjusting a rudder angle so that a course direction of the ship approaches the turning direction stored in the memory, of the tangent.

According to the above-described configuration, it is possible to provide an automatic steering control apparatus and an autopilot which comprise means for enabling a ship to turn around a desired turning center position as a center without being affected by an extraneous factor, such as a tidal current or the like.

In the case of conventional autopilots, a ship carrying the device only travels in a straight line toward a target bearing. According to the present invention, the ship can accurately turn around a designated turning center position while maintaining a designated turning radius, without being affected by an extraneous factor, such as a tidal current or the like.

DETAILED DESCRIPTION OF THE INVENTION

Figure 1:
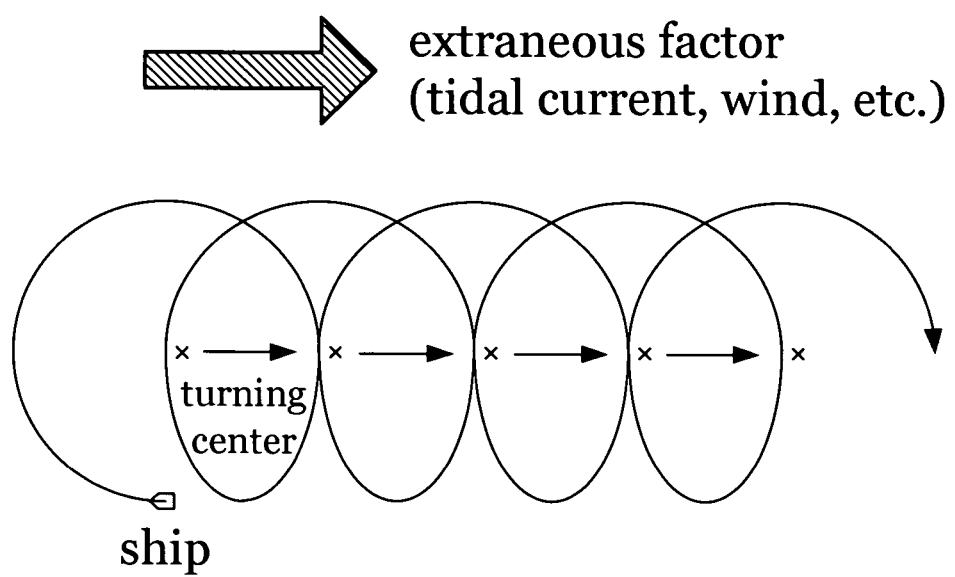
FIG. 1 is a diagram illustrating a problem with turning of conventional autopilots.
Figure 2:
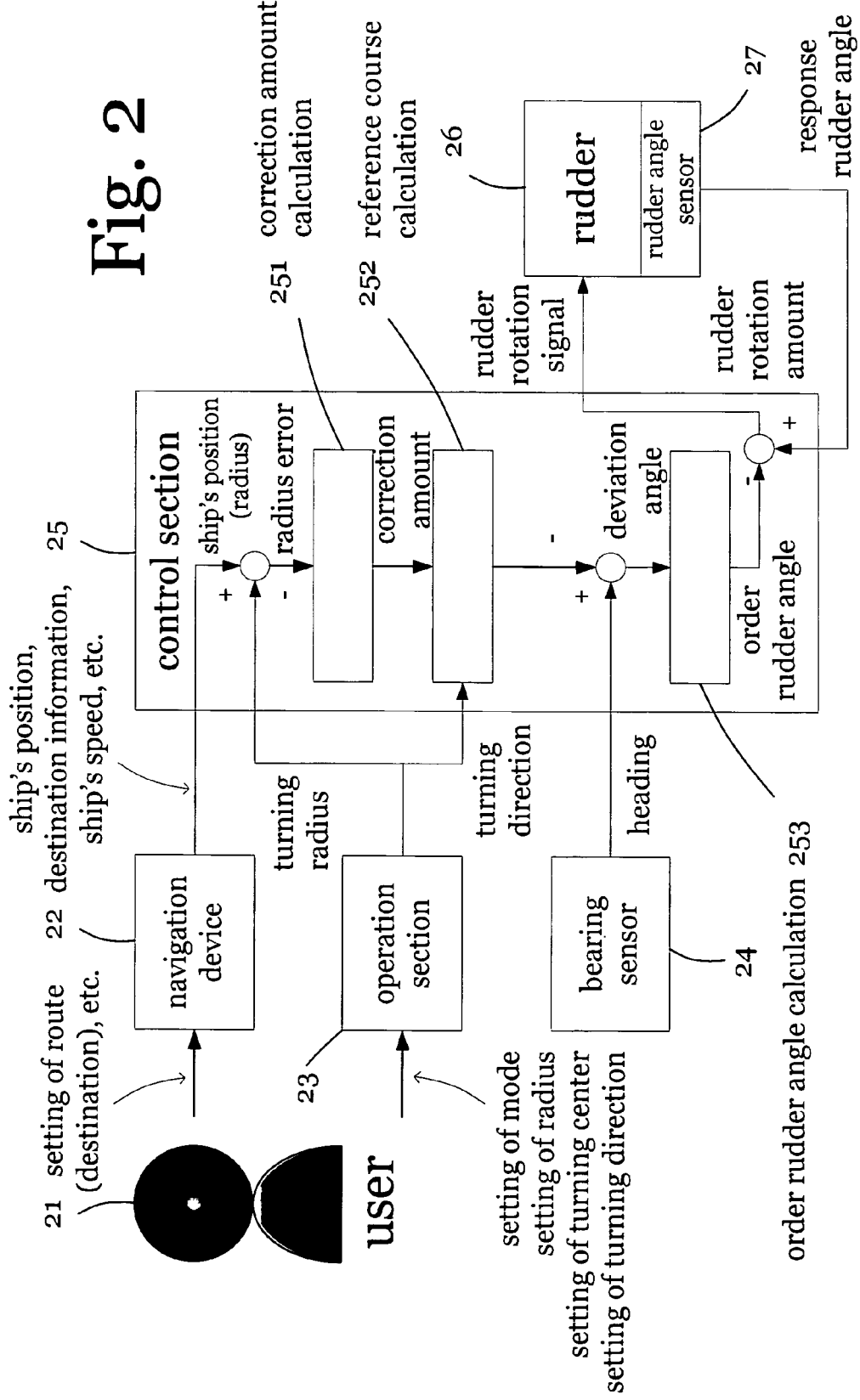
FIG. 2 is a block diagram illustrating an autopilot according to the present invention.

A configuration of an autopilot according to the present invention is illustrated in FIG. 2.

The user inputs a turning center, a turning radius, and a turning direction via an operation section 23. For example, the operation section 23 is composed of a personal computer and the like, and has a memory section thereinside. The memory section can store the turning center, the turning radius and the turning direction which are input by the user.

26 indicates a rudder machine which comprises a rudder angle adjuster for adjusting a rudder angle based on an instruction from a control section 25. The instruction input to the rudder machine 26 (rudder angle adjuster) is calculated by the control section 25 based on the turning center, the turning radius and the turning direction, and a heading of the ship obtained from a bearing sensor 24.

A method for enabling a turning motion of the autopilot of the present invention will be described in detail with reference to FIGS. 3 to 5.

Figure 3:
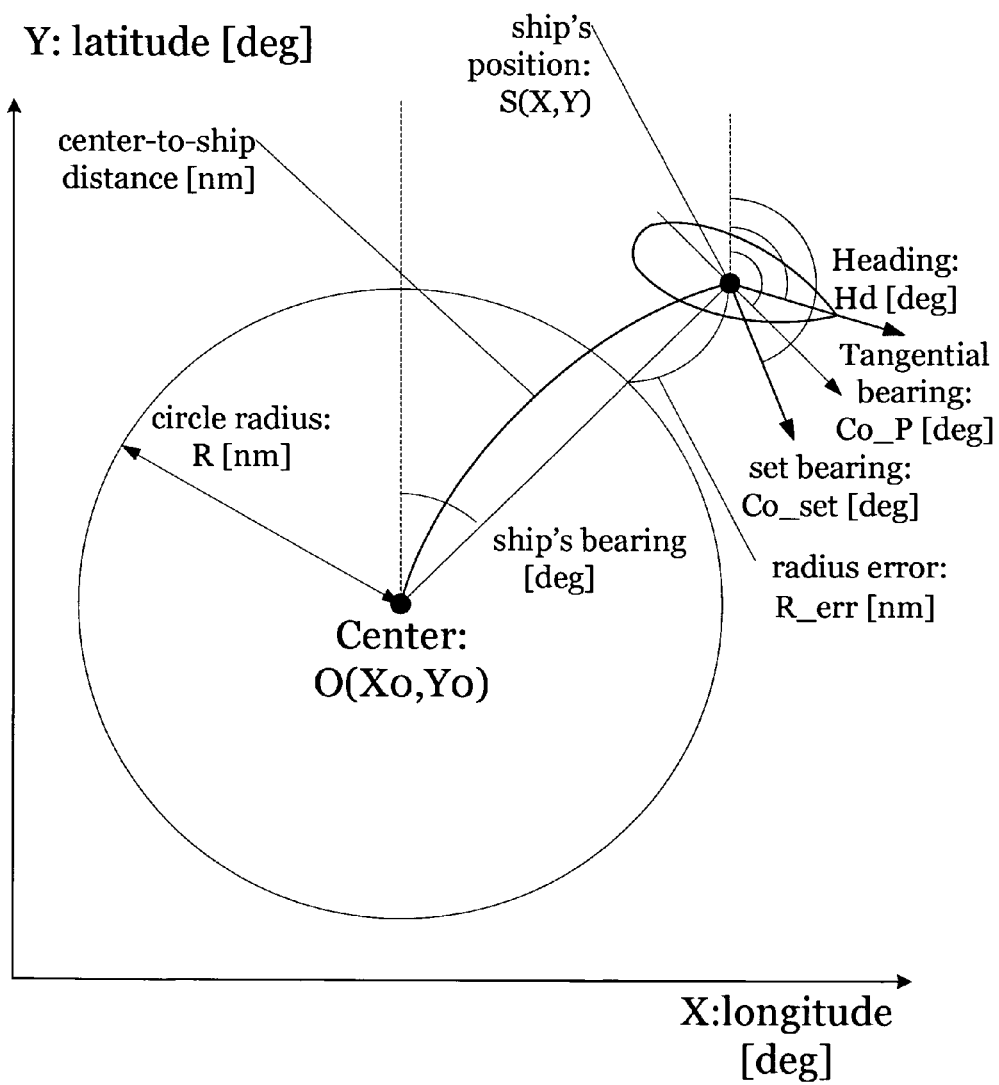
FIG. 3 is a diagram illustrating a coordinate system when a ship carrying the autopilot of the present invention starts a turning motion.

FIG. 3 is a diagram illustrating a coordinate system when a ship carrying the autopilot of the present invention starts a turning motion.

Figure 4:
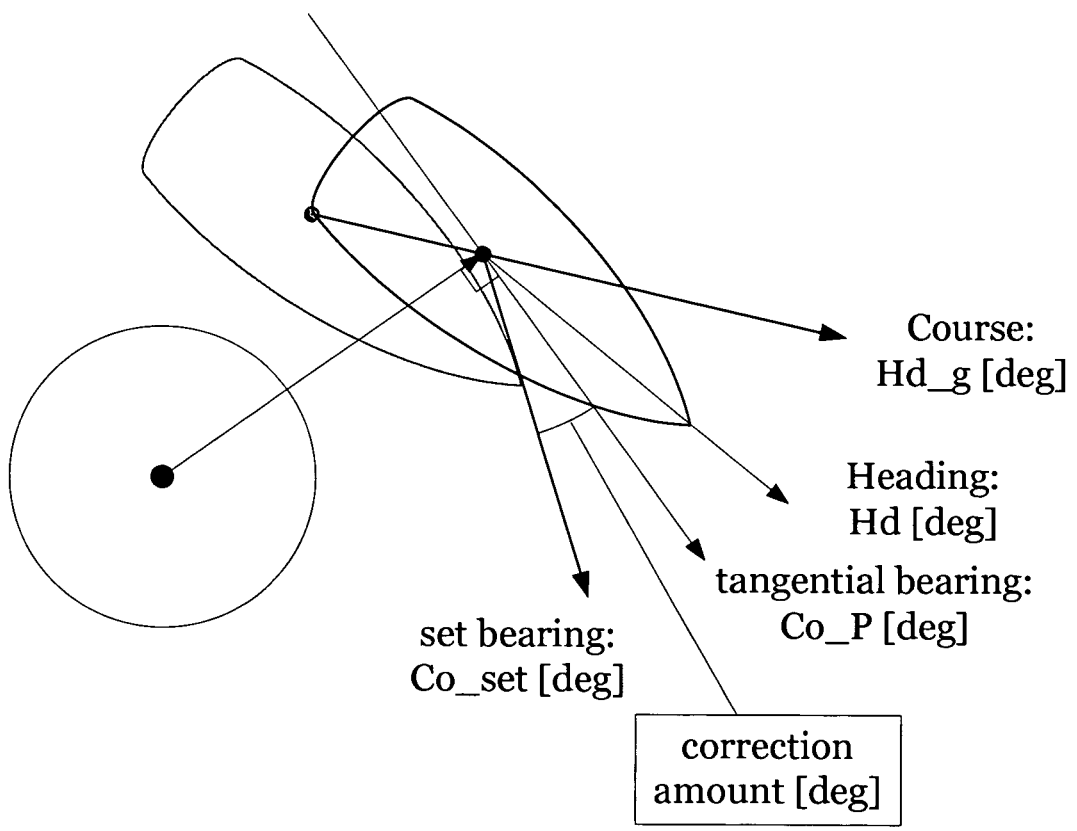
FIG. 4 is a diagram illustrating an enlarged view of the ship of FIG. 3.

FIG. 4 is a diagram illustrating an enlarged view of the ship of FIG. 3.

Figure 5:
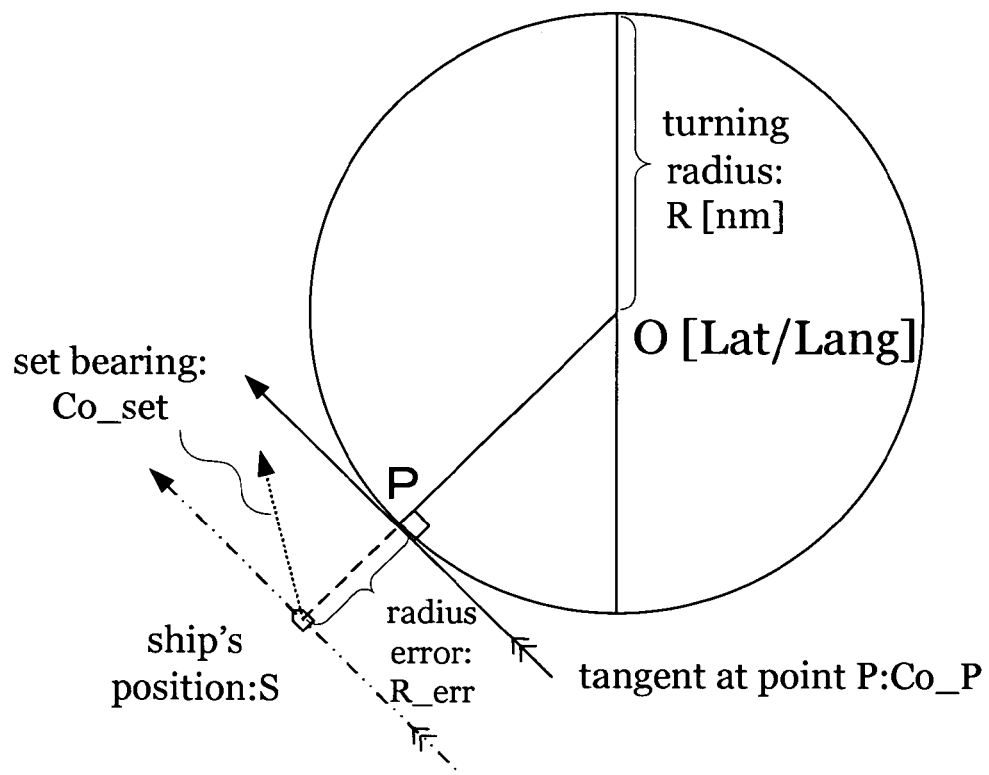
FIG. 5 is a diagram illustrating a situation where a ship carrying the autopilot of the present invention starts a turning motion.

FIG. 5 is a diagram illustrating a situation where the ship carrying the autopilot of the present invention starts a turning motion.

The ship carrying the autopilot of the present invention is provided with a positioning device for measuring a position of the ship (e.g., a navigation device 22 (FIG. 2), such as a GPS positioning device, etc.), and can measure the position $S(x, y)$ of the ship. The operator sets a turning center $O(x_o, y_o)$ and a turning radius. Therefore, these values are known values. Thus, a radius error: R_err obtained by subtracting the turning radius from a distance between the position of the ship and the turning center can be easily calculated.

A point where a straight line connecting the position of the ship and the turning center and a turning circle intersect is represented by P. A tangent to the turning circle at the point P is calculated, and a tangential bearing: Co_P is calculated, depending on the turning direction.

After calculating the tangential bearing Co_P, the radius error: R_err is multiplied by a variable coefficient to calculate a set bearing Co_set. Specifically, when R_err is positive (outside beyond the turning radius), Co_set is obtained by:

$$Co\_set = Co\_P + kp \cdot R\_err \text{(clockwise direction)}$$

$$Co\_set = Co\_P - kp \cdot R\_err \text{(anticlockwise direction)}$$

where Co_P is:

OP($\rightarrow$)+90° in the case of the clockwise direction, and
OP($\rightarrow$)−90° in the case of the anticlockwise direction.

The set bearing Co_set thus calculated is assumed to be a controlled course of autopilot.

Note that, as described below, kp is a variable coefficient which varies in association with the radius error: R_err which varies over time. The kp is related to the radius error. This value is adjusted by addition or subtraction of Δkp in predetermined time intervals, depending on a required robustness of a control. In an example hereinafter described, if an evaluated value calculated based on the radius error and a bearing deviation is better than an evaluated value obtained during the previous adjustment, 2Δkp (constant value) is subtracted from kp at that time. If the evaluated value calculated based on the radius error and the bearing deviation is worse than the evaluated value obtained during the previous adjustment, Δkp (constant value) is added to kp at that time. By performing this control continuously, a control of robustness required against disturbance can be sequentially performed, thereby making it possible to draw a track close to a perfect circle around a fixed point as a center.

In the present invention, only the set bearing (rudder angle) is calculated. Thereafter, the autopilot is used to control the rudder by a PID control which is the same as that which is used when the course is maintained. Note that the PID control is a control technique which is most commonly used among automatic control techniques, and in which a combination of P: Proportional, I: Integral, and D: Differential is used to achieve a fine control, resulting in a smooth control.

The autopilot of the present invention has a feedback mechanism in addition to the conventional configuration, and regularly calculates a deviation from the desired turning circle, and performs a control so that the error approaches zero.

An operating procedure of the autopilot of the present invention will be hereinafter described (see FIG. 6).

Before performing turning, a ship's speed V is obtained using the navigation device, and when the ship's speed V is higher than a preset speed (10 kt in this example), it is determined that the speed is so high that a turning motion cannot be performed, so that a turning operation is not started.

After the ship's speed V becomes slower than the preset speed, the operator designates the following.
  Turning center position (latitude longitude)
  Turning radius
  Turning direction (clockwise anticlockwise)
These values are stored in the memory section of the operation section. These values can be preset.

Also, before or after the input by the operator, the position of the ship is obtained from the navigation device, and the heading of the ship is obtained from the bearing sensor.

Based on the designation by the operator, a distance difference between a distance Rnow from the position S of the ship to the turning center O, and a turning radius Rcircle (set by the operator) which is a distance from the intersection P to the turning center O, is obtained as a radius error R_err which is a distance from the position of the ship to the intersection P.

Next, a tangent to the turning circle at the intersection P of a straight line which is drawn from the turning center O to the position of the ship S and the turning circle, is calculated. Note that, in this case, depending on the designated turning direction, the bearing Co_P of the tangential direction is obtained by, as described above:
  OP(→)+90° in the case of the clockwise direction, and
  OP(→)−90° in the case of the anticlockwise direction.
Based on these values, a set direction Co_set is obtained by:

$Co\_set = Co\_P + kp \cdot R\_err$ (clockwise direction), and $Co\_set = Co\_P - kp \cdot R\_err$ (anticlockwise direction).

A deviation angle DV is obtained from a difference between the set bearing Co_set and the heading Hd of the ship.

Thereafter, the deviation angle DV is used as an input for the course maintaining operation (PID control) which is performed as a common process by the autopilot, or as evaluation of the control. Specifically, when the deviation angle is large, there is a large deviation from a target course, so that it can be evaluated that the control is poor, and therefore, the rudder is largely steered in an actual control.

Figure 6:
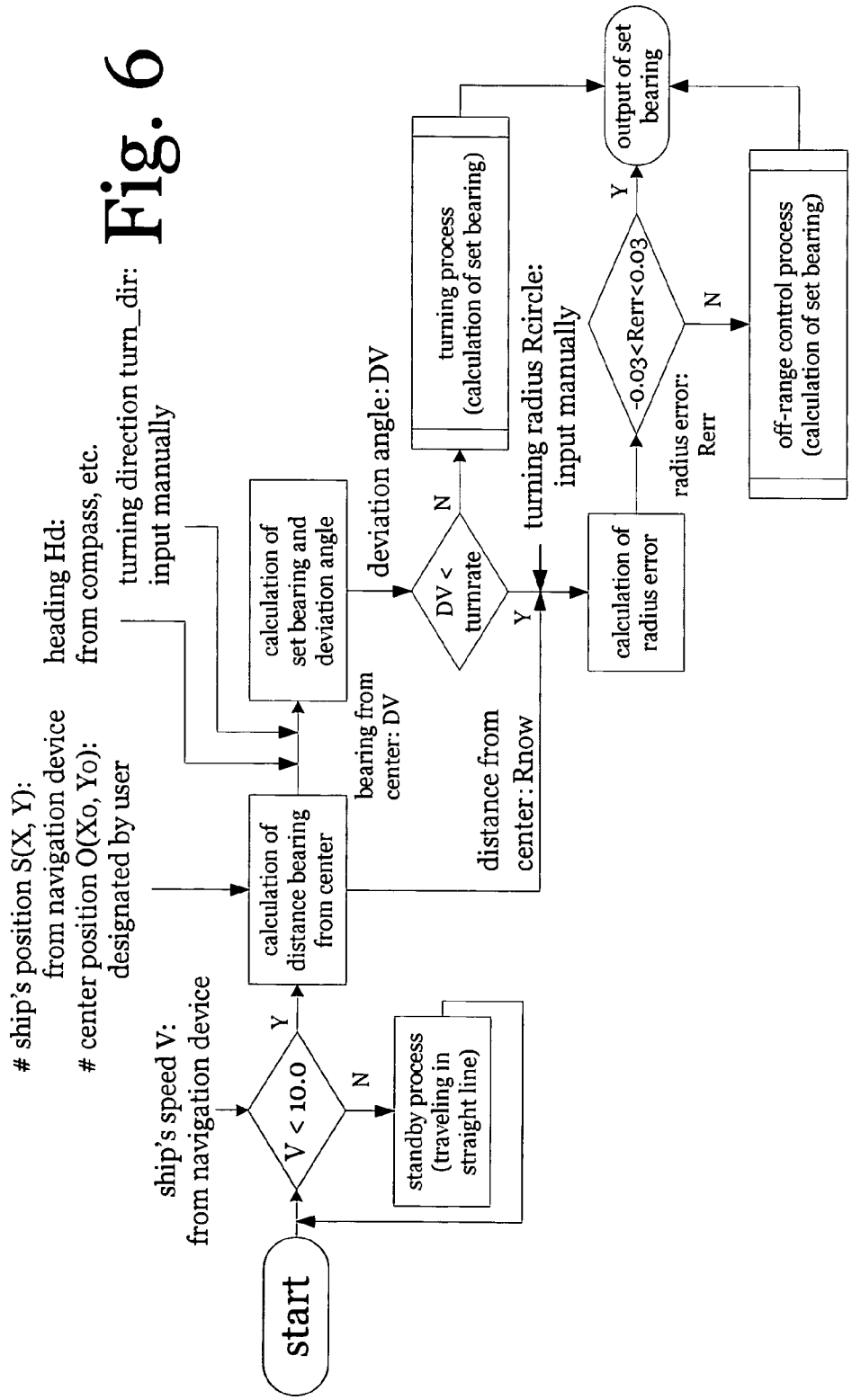
FIG. 6 is a flowchart illustrating an operating procedure of the autopilot of the present invention.

In this embodiment, when the deviation angle DV is larger than or equal to a predetermined value, the ship is turned in the "turning" step of FIG. 6. At the same time, the set bearing is recalculated. After this process, a "set bearing output" is performed with respect to the control section of the autopilot.

When the deviation angle DV is smaller than or equal to the predetermined value, if the radius error R_err is within a predetermined plus/minus range around the position P of FIG. 5 as a center (in this embodiment, −0.03 nm (nautical mile)<R_err<0.03 nm), the "set bearing output" is enabled, and if the radius error R_err exceeds the range, the turning motion is not immediately started, and the ship is caused to turn and gradually approach a planned turning circle while turning a path larger than the desired turning circle.

For example, if the ship is at a distance of miles from the desired turning circle, the ship turns on a circumference of a turning circle, and initially goes straight toward the turning circle, i.e., gives a highest priority to approaching the turning circle. If the heading of the ship is directed to an opposite direction (directed to the left, directed to the center, etc., though a clockwise direction is desired), the ship needs to be initially directed in a bearing which causes the ship to go roughly along the turning circle. Such an operation is performed in an "off-range control process". In the "off-range control process", further, recalculation of the set bearing is also performed.

Next, the variable coefficient: kp which is multiplied by the radius error: R_err will be described in detail (see FIG. 7). The kp is a variable coefficient which is multiplied by R_err when the set bearing Co_set is calculated (see the expressions above), and as described above, varies over time in association with R_err. The kp is adjusted by addition or subtraction of Δkp in predetermined time intervals, depending on a required robustness of a control.

Specifically, the proportional coefficient kp which is multiplied by the radius error R_err, is adjusted based on an evaluated value eval which is calculated from the deviation angle and the radius error, and the previous evaluated value eval_last.

A procedure for the adjustment will be described as follows.

(S0) An initial evaluated value is calculated in accordance with expression (1):

$$eval = R\_err^2 + 0.1 * dv\_g^2 \qquad (1)$$

where R_err is the radius error, dv_g is the deviation angle, 0.1 preceding dv_g is a coefficient obtained by experiments (the coefficient is not limited to this value).

(S1) A flag is checked.
When the flag is not ON,
(S2) the adjusted amount Δkp is calculated in accordance with expression (2):

$$\Delta kp = co\_eval * d\_eval \qquad (2)$$

where an evaluated value difference d_eval is given by expression (3):

$$d\_eval = eval - lim\_eval \qquad (3)$$

where lim_eval and co_eval mean a dead zone of the evaluated value, and a coefficient for calculation of Δkp, respectively.

(S3) The adjusted amount Δkp is added to kp.

(S4) The flag is set to be ON.

(S5) After a predetermined time (determined by the size of the circumference and the ship's speed) elapses, the evaluated value eval obtained by S0 is compared with the previous evaluated value eval_last.

(S6) As the result of the comparison, (i) when eval>eval_last (No in S5 of FIG. 7), it means that the evaluation becomes worse, and since the process of (S3) has an adverse influence, a counter operation is performed, i.e., Δkp×2 is subtracted from kp. The resultant kp is smaller by Δkp than kp before the addition in (S3).

(ii) When eval<eval_last (Yes in S5 of FIG. 7), it means that the evaluation becomes better, i.e., the process of (S3) has a satisfactory result. Therefore, Δkp is further added. The resultant kp is larger than by 2×Δkp than kp before the addition in (S3).

(S7) The flag is set to be OFF.

(S8) The value of eval_last is rewritten.

Figure 7:
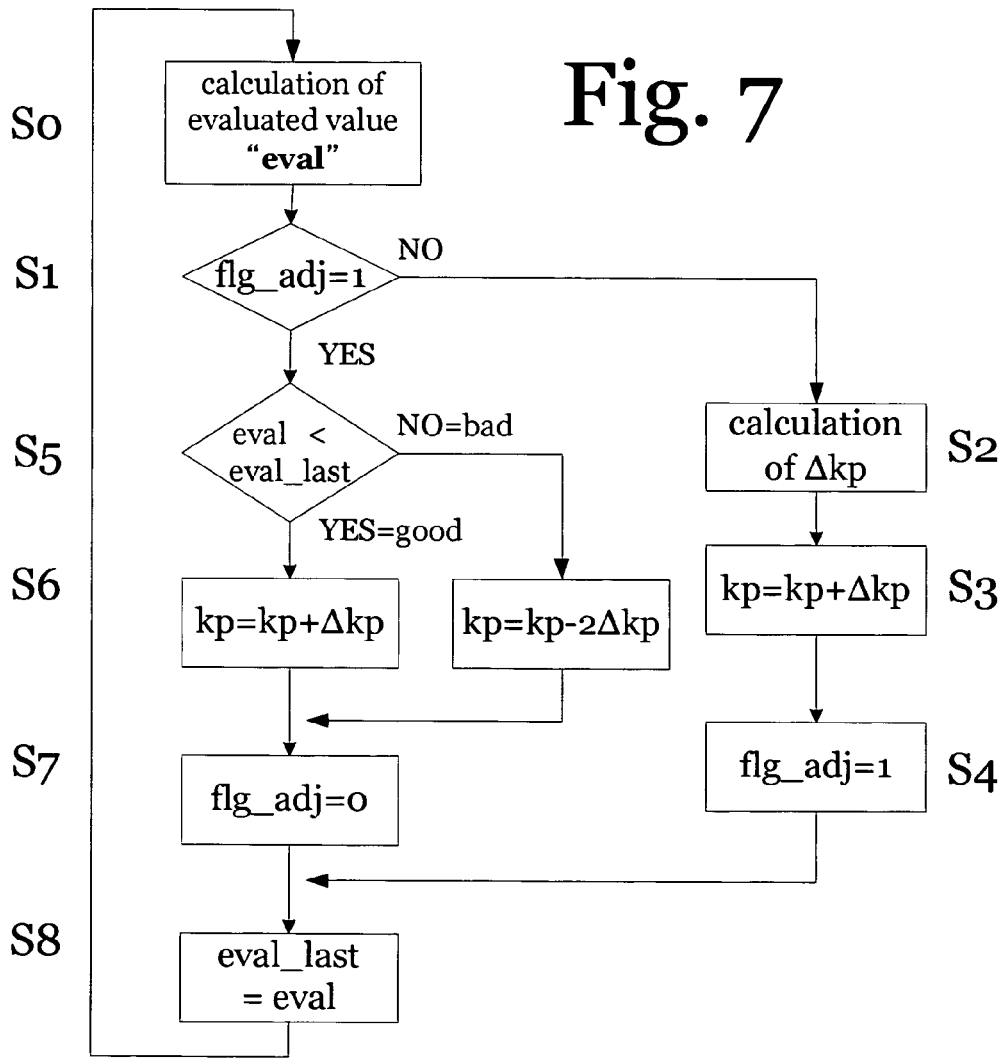
FIG. 7 is a flowchart illustrating an operating procedure for calculating kp.

By repeatedly performing the control loop of FIG. 7, when a strong control is required, the evaluation tends to be increased by the process of (S6)(i), so that kp increases. When a weak control is enough, the evaluation becomes worse (excessive control) due to the process of (S6)(ii), so that kp decreases. Thereby, kp is gradually adjusted. The value of Δkp ranges from a negative value to a positive value, depending on the value of Δeval.

When the value of Δeval is large, the evaluated value significantly changes, and therefore, the adjustment speed is increased by increasing the value of Δkp.

Conversely, when the value of Δeval is small, the evaluation is not much changed by the adjustment, and therefore, the value of Δkp is decreased so as to eliminate waste adjustment, thereby making it possible to prevent the value of kp from changing.

Note that, as illustrated in FIG. 7, this loop is alternately repeated between the right and left sides thereof.

This algorithm calculates and controls only the heading of the ship, but not the speed and others. Thereafter, the same PID control as that when the course is maintained is used to control the rudder.

Figure 8:
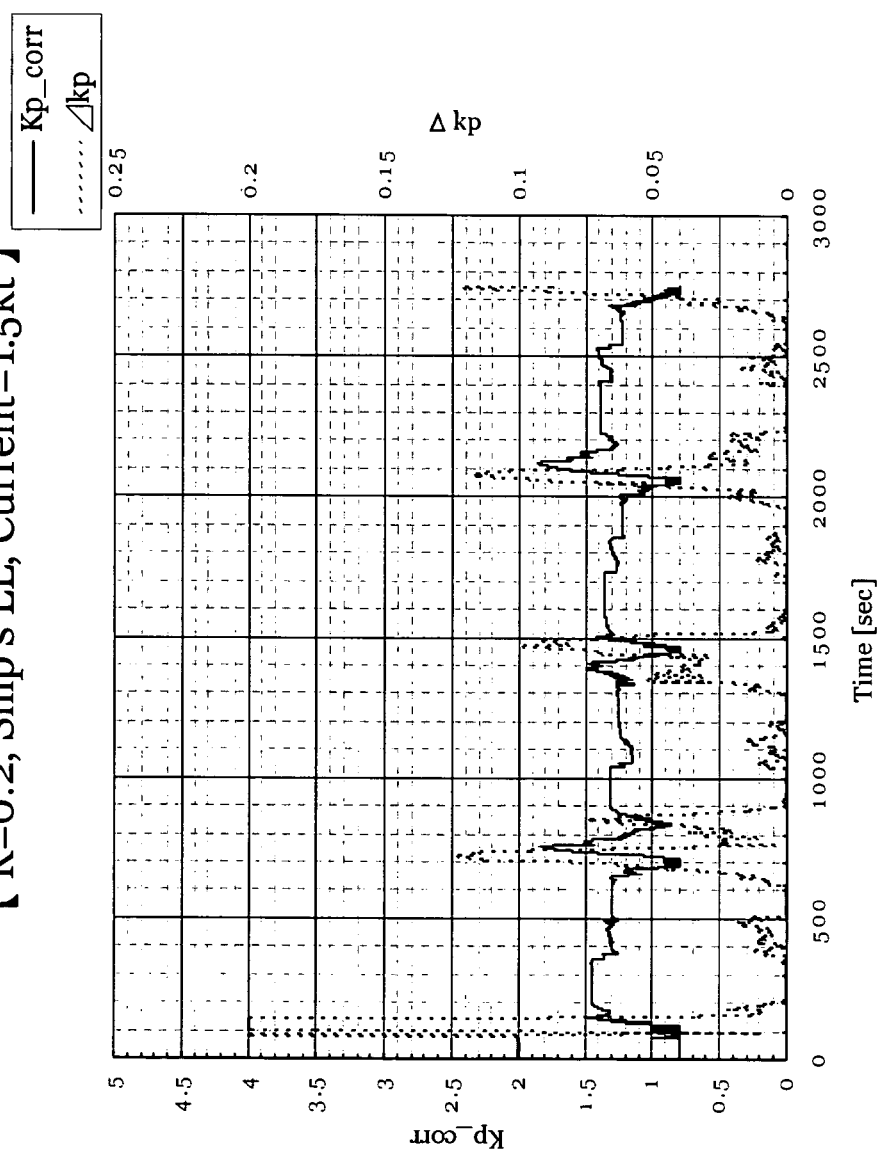
FIG. 8 is a diagram illustrating changes over time in a correction value calculation coefficient kp and a kp adjusted width Δkp.
Figure 9:
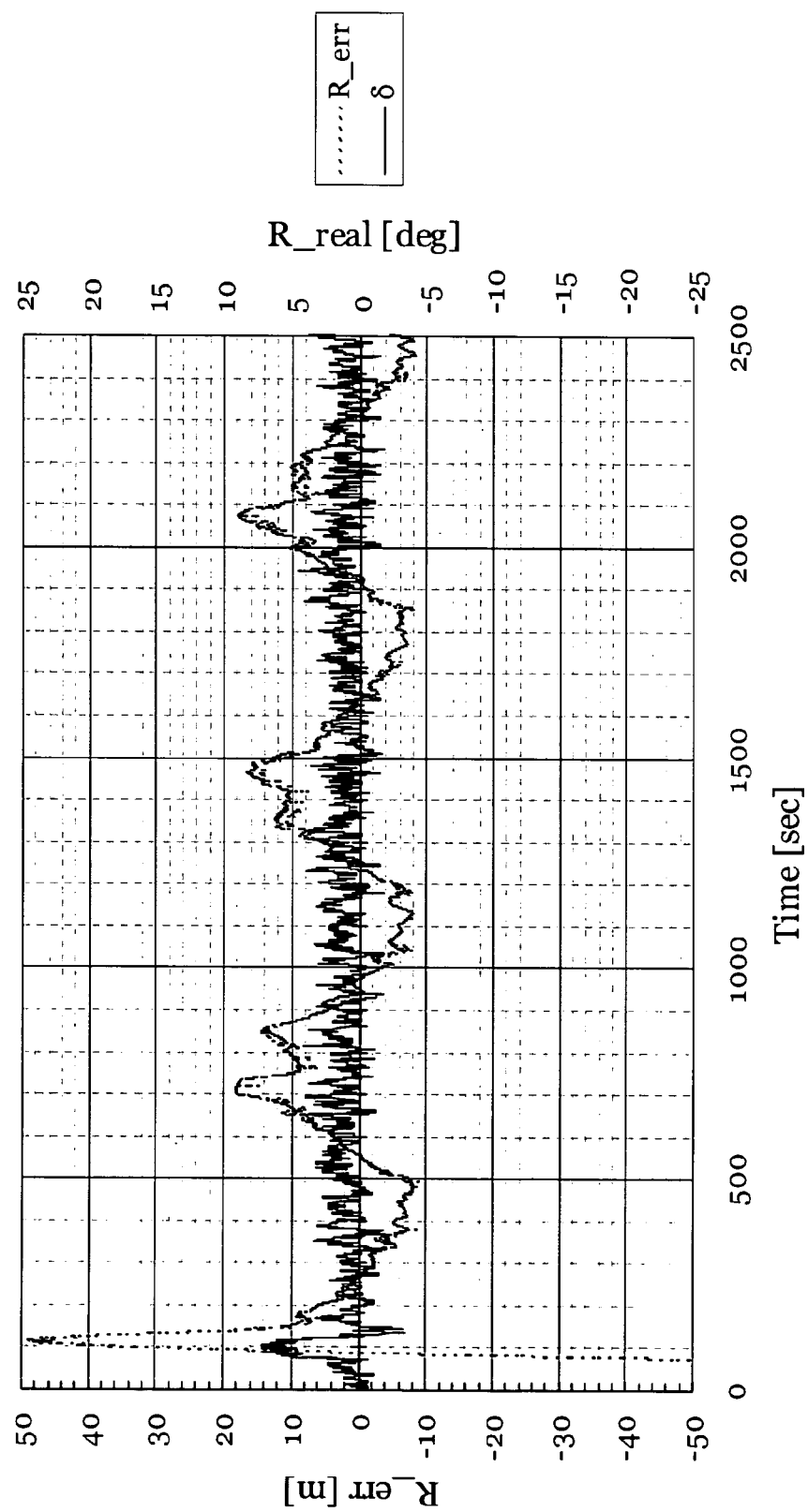
FIG. 9 is a diagram changes over time in a radius error and a response rudder angle.
Figure 10:
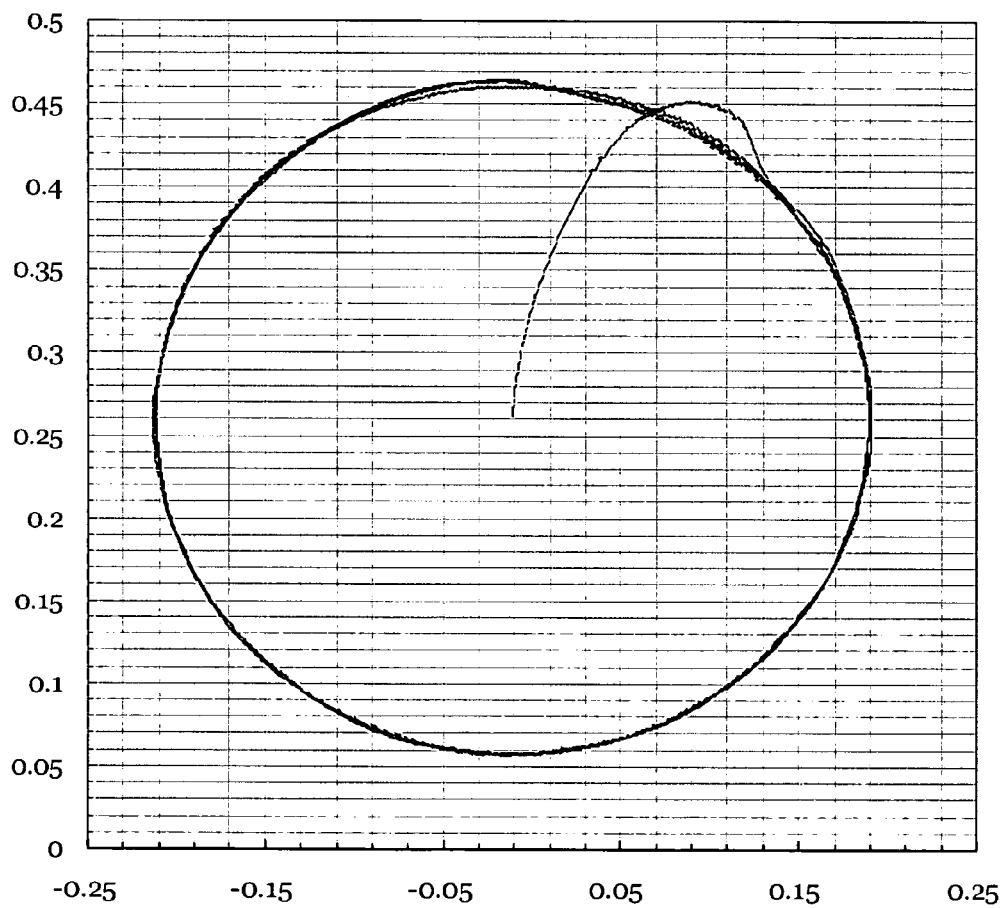
FIG. 10 is a plot diagram from instruction for a turning motion to a turning state.

FIGS. 8 to 10 illustrate the results of simulation of the present invention.

"R=0.2" means a turning radius of 0.2 nm. "Ship's LL" means that a mode in which the position of the ship is the center of the turning circle at the start, is carried out (there are other modes in which the center is designated using a cursor from a distant place, and a final point is set as the center after determining a route). As an extraneous factor, there is a tidal current of 1.5 kt in a constant direction.

In FIG. 9, it can be seen that the radius error fluctuates around zero, having positive values and negative values.

In FIG. 10, the center position of a turning motion does not move no matter that there is an extraneous factor which is a tidal current.

Although the heading of the ship may be opposite to a designated turning direction, when the heading of the ship is significantly deviated from the tangential bearing (e.g., 40°), the course is initially changed using the tangential bearing as a set bearing (turn to the closer of the right and the left), and after a deviation angle between the tangent and the heading of the ship has become small, a control for correcting the radius is performed.

In the above-described example, the operator designates all of the turning center position, the turning radius and the turning direction. The present invention is not limited to the example.

For example, the rudder angle may be adjusted until a distance from the position of the ship to the turning center becomes substantially equal to the turning radius, and then, from that time, the rudder angle may be adjusted so that a track of the ship draws an arc having the turning radius with respect to the turning center.

The operator may designate only the turning center position and the turning radius, and may not designate the turning direction, and the ship may automatically turn to a direction close to the heading of the ship. Alternatively, when the operator may designate only the turning center position, a distance from the turning center position to the position of the ship may be automatically recognized as the turning radius, and the ship may be controlled to perform a turning motion in a traveling direction of the ship directly from the position of the ship.

In the case of conventional autopilots, a ship carrying the device only travels in a straight line toward a target bearing. According to the present invention, the ship can accurately turn around a destination (a designated turning center position) with a designated turning radius. With this function, the autopilot can be applied to wider applications, including, for example:

search (the surrounding of a point can be searched in a fish sonar or the like by changing the turning radius);

life saving (life saving can be performed around the ship without hitting a subject to be saved, by turning the ship accurately);

standby (holding the ship at a fixed point requires a complicated operation which is a combination of adjustment of an engine, operation of a rudder, and the like, but if low-speed turning is performed, such a complicated operation is not required); and in addition, by moving the turning center, a combination of the autopilot and an echo sounder can be used for production of a sea floor map and resource prospecting.

INDUSTRIAL APPLICABILITY

The present invention relates to an automatic steering control apparatus for ships which outputs a command rudder angle based on a deviation of the heading of the ship from a reference course, and particularly, can be used for an autopilot which enables a ship to turn around a desired turning center position with a desired turning radius.

The invention claimed is:

1. An automatic steering control apparatus which is carried in a ship having a positioning device for measuring a position of the ship, and outputs a command rudder angle based on a deviation of a heading of the ship from a reference course, comprising:

a user input device for inputting a desired turning center position and a desired turning radius;

a memory for storing the desired turning center position and desired turning radius input by the input device; and a control unit for determining a set bearing so that a track of the ship draws an arc around a fixed desired turning center stored in the memory with the desired turning radius, wherein the set bearing is calculated based on a radius deviation between the desired turning radius and a current turning radius and a coefficient value which varies over time in association with the radius deviation, the current turning radius being a distance from the position of the ship measured by the ship's positioning device to the turning center, and a rudder angle output device for outputting a command rudder angle, wherein the rudder angle is determined based on a deviation angle between the set bearing and a current ship heading measured by a bearing sensor, wherein the coefficient value is continuously adjusted in predetermined time intervals depending on a required robustness of a control of the ship against extraneous factor such that the track of the ship does not substantially deviate from the arc around the fixed desired turning center.

2. An autopilot which is carried in a ship having a positioning device for measuring a position of the ship, and outputs a command rudder angle based on a deviation of a heading of the ship from a reference course, comprising:
   a user input device for inputting a desired turning center position and a desired turning radius;
   a memory for storing the turning center position input by the input device;
   a control unit for determining a set bearing so that a track of the ship draws an arc around a fixed desired turning center stored in the memory with the desired turning radius, wherein the set bearing is calculated based on a radius deviation between the desired turning radius and a current turning radius and a coefficient value which varies over time in association with the radius deviation, the current turning radius being a distance from the position of the ship measured by the ship's positioning device to the turning center; and
   a rudder angle output device for outputting a command rudder angle, wherein the rudder angle is determined based on a deviation angle between the set bearing and a current ship heading measured by a bearing sensor, wherein the coefficient value is continuously adjusted in predetermined time intervals depending on a required robustness of a control of the ship against extraneous factor such that the track of the ship does not substantially deviate from the arc around the fixed desired turning center.

3. The autopilot according to claim 2, wherein the input device can input a desired turning direction, the memory stores the turning direction input by the input device, and the rudder angle adjuster adjusts a rudder angle so that the ship turns in the turning direction stored in the memory.

4. An automatic steering control apparatus which is carried in a ship having a positioning device for measuring a position of the ship, and outputs a command rudder angle based on a deviation of a heading of the ship from a reference course, comprising:
   a user input device for inputting a desired turning radius and a desired turning center position;
   a memory for storing the turning radius and the turning center position input by the input device;
   a control unit for determining a set bearing so that a distance from the position of the ship measured by the ship's positioning device to a fixed turning center stored in the memory, approaches the turning radius stored in the memory, wherein the set bearing is calculated based on a radius deviation between the desired turning radius and a current turning radius and a coefficient value which varies over time in association with the radius deviation; and
   a rudder angle output device for outputting a command rudder angle so as to adjust a rudder angle so that a track of the ship draws an arc around the fixed turning center with the turning radius from the time when the distance from the position of the ship to the desired turning center becomes substantially equal to the turning radius, wherein the rudder angle is determined based on a deviation angle between the set bearing and a current ship heading measured by a bearing sensor, wherein the coefficient value is continuously adjusted in predetermined time intervals depending on a required robustness of a control of the ship against extraneous factor such that the track of the ship does not substantially deviate from the arc around the fixed turning center.

5. The automatic control apparatus according to claim 4, comprising an interrupt controller for independently changing the turning direction, the turning radius and the turning center position stored in the memory.

6. An autopilot which is carried in a ship having a positioning device for measuring a position of the ship, and outputs a command rudder angle based on a deviation of a heading of the ship from a reference course, comprising:
   a user input device for inputting a desired turning radius and a desired turning center position;
   a memory for storing the turning radius and the turning center position input by the input device;
   a control unit for determining a set bearing so that a distance from the position of the ship measured by the ship's positioning device to a fixed turning center stored in the memory, approaches the turning radius stored in the memory, wherein the set bearing is calculated based on a radius deviation between the desired turning radius and a current turning radius and a coefficient value which varies over time in association with the radius deviation; and
   a rudder angle adjuster that adjusts a rudder angle so that a track of the ship draws an arc around the fixed turning center with the turning radius from the time when the distance from the position of the ship to the turning center becomes substantially equal to the turning radius, wherein the rudder angle is determined based on a deviation angle between the set bearing and a current ship heading measured by a bearing sensor, wherein the coefficient value is continuously adjusted in predetermined time intervals depending on a required robustness of a control of the ship against extraneous factor such that the track of the ship does not substantially deviate from the arc around the fixed turning center.

7. An autopilot which is carried in a ship having a positioning device for measuring a position of the ship, and outputs a command rudder angle based on a deviation of a heading of the ship from a reference course, comprising:
   a user input device for inputting a desired turning direction, a desired turning radius, and a desired turning center position;
   a memory for storing the turning direction, the turning radius and the turning center position input by the input device;
   a control unit for obtaining a straight line connecting the position of the ship measured by the ship's positioning device and a fixed turning center stored in the memory for storing the turning center position, obtaining an intersection of the straight line and a turning circle drawn around the fixed turning center stored in the memory with the turning radius stored in the memory, obtaining a tangent to the turning circle at the intersection, calculating a distance difference between the position of the ship and the intersection, and determining a set bearing so that a course direction of the ship approaches the turning direction of the tangent stored in the memory, wherein the set bearing is calculated based on the distance difference and a coefficient value which varies over time in association with the distance difference; and a rudder angle output device for outputting a command rudder angle, wherein the rudder angle is determined based on a deviation angle between the set bearing and a current ship heading measured by a bearing sensor, wherein the coefficient value is continuously adjusted in predetermined time intervals depending on a required robustness of a control of the ship against extraneous factor such that a track of the ship does not substantially deviate from the turning circle drawn around the fixed turning center.

* * * * *